US011176512B2

(12) United States Patent
Siris

(10) Patent No.: US 11,176,512 B2
(45) Date of Patent: *Nov. 16, 2021

(54) CONCEPTS FOR LOCATING ASSETS UTILIZING LIGHT DETECTION AND RANGING

(71) Applicant: United Parcel Service of America, Inc., Atlanta, GA (US)

(72) Inventor: Marc David Siris, Sandy Springs, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 484 days.

This patent is subject to a terminal disclaimer.

(21) Appl. No.: 16/001,470

(22) Filed: Jun. 6, 2018

(65) Prior Publication Data

US 2018/0285813 A1 Oct. 4, 2018

Related U.S. Application Data

(63) Continuation of application No. 14/973,025, filed on Dec. 17, 2015, now Pat. No. 10,007,888.

(Continued)

(51) Int. Cl.
*G06F 11/30* (2006.01)
*G06Q 10/08* (2012.01)
(Continued)

(52) U.S. Cl.
CPC ............ *G06Q 10/0833* (2013.01); *G01S 7/51* (2013.01); *G01S 17/06* (2013.01); *G01S 17/88* (2013.01); *G01S 17/89* (2013.01); *G06Q 10/08* (2013.01)

(58) Field of Classification Search
CPC .................................................. G06Q 10/0833
See application file for complete search history.

(56) References Cited

U.S. PATENT DOCUMENTS 5,908,283 A 6/1999 Huang et al.
8,068,930 B2 11/2011 Perez et al.
(Continued)

FOREIGN PATENT DOCUMENTS

DE 102005001480 B3 10/2006
DE 102010054343 A1 6/2012
(Continued)

OTHER PUBLICATIONS

Davidson, Mark J., U.S Unpublished U.S. Appl. No. 14/046,368, filed Oct. 4, 2013, titled "Methods, Apparatuses and Computer Program Products For Determining Item Flows".
(Continued)

*Primary Examiner* — Phuong Huynh
(74) *Attorney, Agent, or Firm* — Shook, Hardy & Bacon L.L.P.

(57) ABSTRACT

Various embodiments are directed to systems and methods for utilizing Light Detection and Ranging (LIDAR) sensors to facilitate loading and unloading of assets into receptacles. The LIDAR sensors may be configured to detect the location of various surfaces (e.g., asset surfaces) within a receptacle such that mapping data indicative of the location of the detected surfaces may be generated. This mapping data may facilitate a determination of a total volume of unoccupied space within the receptacle and/or the identification of an unoccupied volume sufficient to accommodate an item having defined dimensions. The mapping data may additionally be indicative of the location of asset identifiers disposed on one or more detected surfaces to facilitate locating a particular asset associated with a provided asset identifier.

18 Claims, 8 Drawing Sheets

Related U.S. Application Data

(60) Provisional application No. 62/093,072, filed on Dec. 17, 2014.

(51) Int. Cl.
    *G01S 17/88*     (2006.01)
    *G01S 7/51*     (2006.01)
    *G01S 17/06*     (2006.01)
    *G01S 17/89*     (2020.01)

(56) References Cited

U.S. PATENT DOCUMENTS

| | | | |
|---|---|---|---|
| 10,007,888 B2* | 6/2018 | Siris | G01S 7/51 |
| 2005/0046584 A1* | 3/2005 | Breed | B60N 2/0232 340/13.31 |
| 2006/0208169 A1* | 9/2006 | Breed | G06K 9/00624 250/221 |
| 2007/0016538 A1 | 1/2007 | Bielefeld et al. | |
| 2008/0262646 A1 | 10/2008 | Breed | |
| 2010/0161170 A1* | 6/2010 | Siris | G06Q 10/08 701/31.4 |
| 2013/0138573 A1 | 5/2013 | Klingenberg et al. | |
| 2015/0130592 A1* | 5/2015 | Lakshminarayanan | B65G 67/20 340/10.1 |
| 2016/0180289 A1 | 6/2016 | Siris | |

FOREIGN PATENT DOCUMENTS

| | | |
|---|---|---|
| EP | 2178035 A1 | 4/2010 |
| EP | 2910472 A1 | 8/2015 |
| WO | 2009/158363 A1 | 12/2009 |
| WO | 2013/148123 A1 | 10/2013 |

OTHER PUBLICATIONS

Eldada, Louay, "Solid State LiDAR for Ubiquitous 3D Sensing", GPU Technology Conference, Quanergy Systems, Inc., Available at: <http://on-demand.gputechconf.com/gtc/2016/presentation/s6726-louay-eldada-quanergy-systems.pdf>, Apr. 6, 2016, 35 pages.

Eldada, Louay, "Today's LiDARs and GPUs Enable Ultra-accurate GPS-free Navigation with Affordable SLAM", GPU Technology Conference, Quanergy Systems, Inc., Available at: <http://on-demand.gputechconf.com/gtc/2014/presentations/S4761-lidar-ultra-accurate-affordable-localization-mapping.pdf>, Mar. 27, 2014, 32 pages.

International Preliminary Report on Patentability received for PCT Patent Application No. PCT/US2015/066274, dated Nov. 22, 2016, 20 pages.

International Search Report and Written Opinion received for PCT Patent Application No. PCT/US2015/066274, dated Mar. 9, 2016, 11 pages.

Notice of Allowance received for U.S. Appl. No. 14/973,025, dated Feb. 27, 2018, 9 pages.

* cited by examiner

CONCEPTS FOR LOCATING ASSETS UTILIZING LIGHT DETECTION AND RANGING

CROSS-REFERENCE TO RELATED APPLICATIONS

This patent application is a continuation of nonprovisional application Ser. No. 14/973,025 filed on Dec. 17, 2015 and entitled "Concepts for Locating Assets Utilizing Light Detection and Ranging", which claims priority from provisional application Ser. No. 62/093,072 filed Dec. 17, 2014 and entitled "Concepts for Locating Assets Utilizing Light Detection and Ranging," both of which are incorporated herein by reference in their entirety.

BACKGROUND

Businesses often expend significant resources in determining the location of various assets within a particular area. In particular, carriers utilize information regarding the location of various assets to streamline shipping and delivery processes, and to provide customers with additional information regarding the current location of an asset being shipped to a customer location. A carrier may be a traditional carrier, such as United Parcel Service of America, FedEx, DHL, courier services, the United States Postal Service, Canadian Post, freight companies (e.g. truck-load, less-than-truckload, rail carriers, air carriers, ocean carriers, etc.) and/or the like. However, a carrier may also be a nontraditional carrier, such as Amazon, Google, Uber, ride-sharing services, crowd-sourcing services, retailers, and/or the like.

The process of locating an asset and recording its location is generally a labor-intensive process requiring a significant amount of skill. Moreover, presently utilized systems and methods for locating assets result in an asset location being determined only periodically, thus resulting in significant periods of time during which the location of the asset cannot be confirmed. For example, common carriers have historically utilized scanners to read asset identifiers located on each of a plurality of assets, and to associate a scan location with each asset identifier. In certain instances, sort personnel may place the scanned asset into a shipping container, vehicle trailer, delivery car, building, area of a building, and/or the like (collectively referred to as "receptacles") such that the asset may be transported to a new location.

Sort personnel must rely on personal skill in determining the optimal location within a receptacle to place each asset to be loaded. However, with improper training or lack of supervision, sort personnel may load receptacles such that a significant amount of underutilized space remains. Thus, additional receptacles must be utilized to store or transport assets throughout the carrier's shipping network.

In various circumstances, sort personnel may be required to place assets at predetermined sort locations within a receptacle. For example, when loading delivery cars with which delivery drivers may deliver individual assets to their delivery locations, sort personnel may be instructed to place assets within the delivery car at specified locations to facilitate asset retrieval when the delivery driver is at a delivery location. This loading process requires the sort personnel to expend significant time ensure the asset is placed in the correct location, and periodically sort personnel place assets in incorrect locations.

Therefore, a need exists in the art for consistent and accurate concepts for locating assets. Such concepts may require substantially less skill in loading receptacles, and may facilitate optimal space usage in loading receptacles.

BRIEF SUMMARY

Various embodiments are directed to a method of determining an amount of unoccupied volume in a receptacle. The method may comprise: providing one or more sensors configured to detect the location of tangible surfaces within the receptacle and to generate location data indicative of the location of detected tangible surfaces; receiving location data indicative of the location of the tangible surfaces within the receptacle from the one or more sensors; generating mapping data indicative of the location of the detected tangible surfaces within the receptacle; and determining, based at least in part on the mapping data, the amount of unoccupied volume between detected surfaces within the receptacle.

In various embodiments, the sensor of the discussed method is a Light Detection and Ranging sensor. Moreover, in certain embodiments, the method further comprises determining, based at least in part on the mapping data, the amount of occupied volume within the receptacle; comparing the amount of occupied volume against data indicative of the total volume of the receptacle; and determining a utilization rate of the receptacle based on the amount of occupied volume and the total volume of the receptacle. Moreover, in various embodiments, the location data is received from a plurality of sensors and wherein generating mapping data comprises logically overlaying the location data received from each of the plurality of sensors. The method may additionally comprise generating an alert upon a determination that the amount of unoccupied space exceed a predetermined threshold.

Various embodiments are directed to a method of determining an optimal asset placement within a receptacle. The method may comprise: providing a sensor configured to detect the location of tangible surfaces within the receptacle and to generate data indicative of the location of detected tangible surfaces; receiving location data indicative of the location of the tangible surfaces within the receptacle from the sensor; generating mapping data indicative of the location of the detected tangible surfaces within the receptacle; receiving asset data comprising data indicative of physical dimensions of an asset; comparing the asset data and the mapping data to identify one or more unoccupied volumes existing between detected tangible surfaces having a size sufficient to accommodate the physical dimensions of the asset; and activating an indicator to indicate the location of one or more of the identified unoccupied volumes.

Moreover, in various embodiments, activating an indicator comprises directing a light source onto at least one of the identified unoccupied volumes. In certain embodiments, the asset data further comprises data indicative of an asset weight; and wherein the method further comprises: identifying, based at least in part on the asset weight, one or more of the identified unoccupied volumes as eligible to receive the asset. Moreover, in various embodiments the asset data is received from one or more sensors collectively configured to measure the physical dimensions of the asset. In certain embodiments, the method further comprises receiving updated location data indicative of the location of the tangible surfaces within the receptacle from the sensor after the asset has been placed within the receptacle. Furthermore, methods of certain embodiments additionally comprise comparing the updated location data and the previously received location data to determine the location of the asset placed within the receptacle; and storing data indicative of the location of the asset placed within the receptacle in association with the asset data.

Certain embodiments are directed to a method of locating an asset positioned within a receptacle. In various embodiments, the method comprises: providing one or more sensors collectively configured to: detect the location of tangible surfaces within the receptacle; detect the location of an asset identifier disposed on one or more of the detected tangible surfaces with the receptacle; and generate data indicative of the location of detected tangible surfaces and indicative of the location of the detected asset identifiers; associating the detected asset identifiers with one or more of the detected tangible surfaces based at least in part on the detected location of the tangible surfaces and the location of the detected asset identifiers; generating mapping data comprising data indicative of the location of the one or more detected tangible surfaces and the corresponding asset identifiers; receiving a request to locate a particular asset having a corresponding asset identifier; comparing the request and the mapping data to determine the location of the asset having the corresponding asset identifier; and activating an indicator to indicate the location of the asset having the corresponding asset identifier.

In various embodiments, the sensors may comprise at least one Light Detection and Ranging sensor. Moreover, the asset identifier may comprise a bar code printed on a surface of an asset. In certain embodiments, a first set of sensors are configured to detect the location of the tangible surfaces within the receptacle; a second set of sensors are configured to detect the location of the asset identifier disposed on one or more of the detected tangible surfaces within the receptacle; and associating the detected asset identifiers with one or more of the detected tangible surfaces comprises logically overlaying the data received from the first set of sensors and the data received from the second set of sensors. In various embodiments, the request to locate the particular asset is received from a mobile device. Moreover, in various embodiments, activating an indicator comprises illuminating one or more lights positioned proximate the determined location of the asset having the corresponding asset identifier. In yet other embodiments, generating the mapping data is performed in response to receipt of the request to locate the particular asset.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
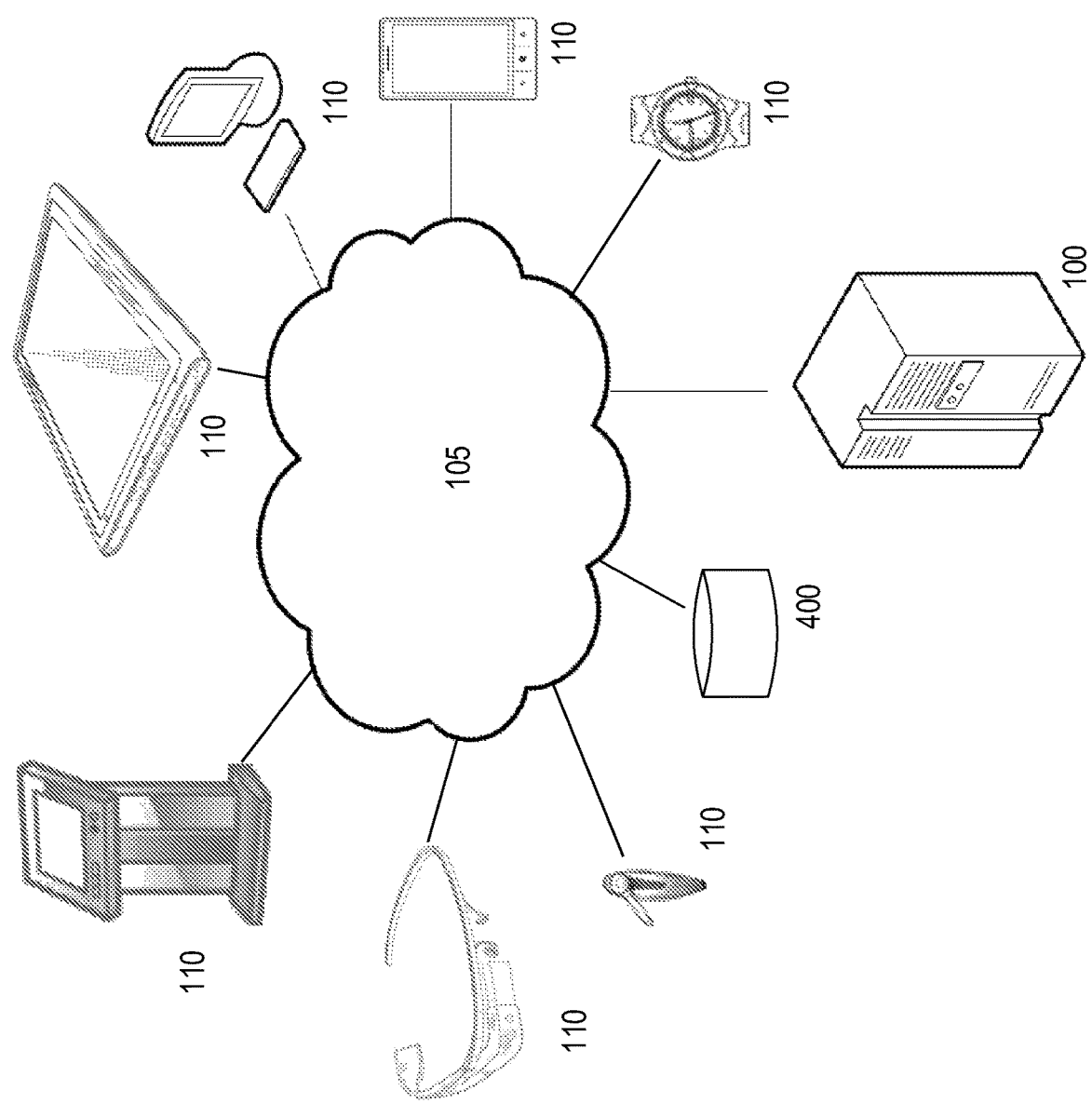
FIG. 1 is an overview of a system that can be used to practice embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments of the present invention utilize detection devices, such as Light Detection and Ranging (LIDAR) devices, to facilitate increased receptacle space utilization and asset selection. One or more computing system may utilize one or more detection devices to determine the amount of space available for additional assets in a given receptacle, and may determine whether the receptacle has been loaded inefficiently based on user defined efficiency parameters. For example, if more than 45% of the total interior volume of a particular receptacle is empty, the system may be configured to determine that the receptacle has been inefficiently loaded. Such configuration may be used to identify "false walls" erected by loading personnel in order to hide unused space, or may be used to identify incorrectly loaded receptacles loaded by inexperienced loading personnel.

Moreover, the one or more detection devices may be used to measure the dimensions of the open volumes within the receptacle in order to identify possible sort locations for an identified asset to be loaded. One or more computing devices may receive information/data indicative of the size and location of each of the open volumes and the size and shape of the asset to be loaded, and may determine appropriate sort locations at which the asset may be loaded. The system may then utilize an indicating device configured to highlight the optimal location at which the asset may be loaded.

The one or more detection devices may also be utilized to identify the location of a previously loaded asset when the asset is to be unloaded. The one or more detection devices may scan the interior of a receptacle and determine the location and identity of each asset loaded therein. Based on the information/data identifying each asset within the interior of the receptacle and information/data indicating a particular asset to be removed from the receptacle, a computer system may identify the current location of the asset to be removed. Information/data indicating the current location of the asset to be removed may be transmitted to a location highlighting system configured to highlight the current location of the asset to be removed.

Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an illustration of an exemplary embodiment of the present invention. As shown in FIG. 1, this particular embodiment may include one or more carrier computing entities 100, one or more networks 105, one or more user computing entities 110, and/or one or more detection devices 400. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier Computing Entities

Figure 2:
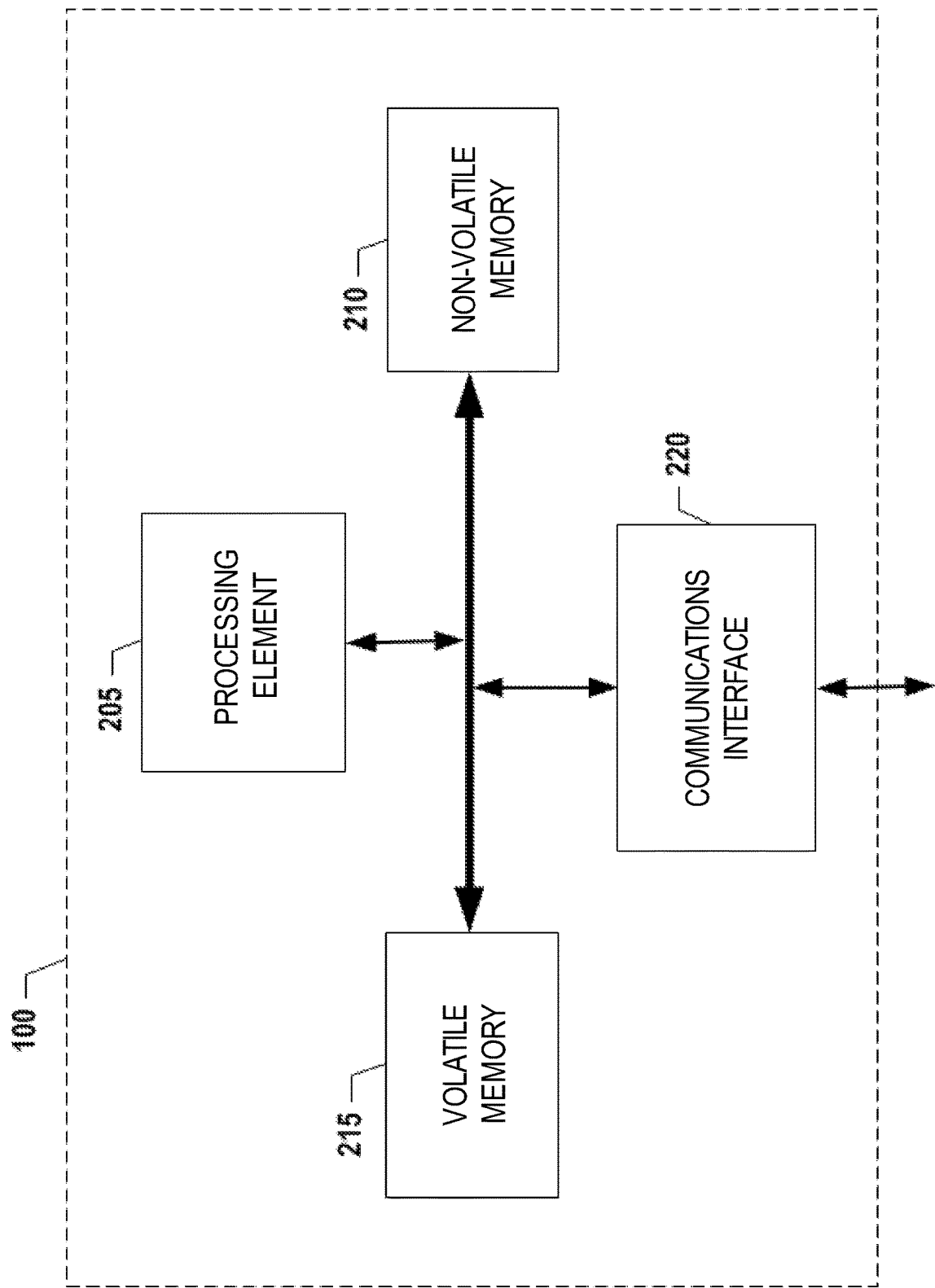
FIG. 2 is an exemplary schematic diagram of a carrier computing entity according to one embodiment of the present invention.

FIG. 2 provides a schematic of a carrier computing entity 100 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the carrier computing entity 100 may include or be in communication with one or more processing elements 205 (also referred to as processors, processing circuitry, and/or similar terms used herein interchangeably) that communicate with other elements within the carrier computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., item/shipment database 40), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the carrier computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier computing entity 100 with the assistance of the processing element 205 and operating system.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier computing entity 100 may include or be in communication with one or more input elements, such as a keyboard input, a mouse input, a touch screen/display input, motion input, movement input, audio input, pointing device input, joystick input, keypad input, and/or the like. The carrier computing entity 100 may also include or be in communication with one or more output elements (not shown), such as audio output, video output, screen/display output, motion output, movement output, and/or the like.

In one embodiment, the carrier computing entity 100 may include various payment features and functionalities. Payments (received or paid) may be in a variety of forms, such as via debit cards, credit cards, direct credits, direct debits, cash, check, money order, Internet banking, e-commerce payment networks/systems (e.g., PayPal™, Google Wallet, Amazon Payments, Apple Pay), virtual currencies (e.g., Bitcoins), award or reward points, and/or the like. Such payments may be made using a variety of techniques and approaches, including through NFC technologies such as PayPass, Android Beam, BlueTooth low energy (BLE), and various other contactless payment systems. Further, such payment technologies may include PayPal Beacon, Booker, Erply, Leaf, Leapset, Micros, PayPal Here, Revel, ShopKeep, TouchBistro, Vend, and/or the like.

As will be appreciated, one or more of the carrier computing entity's 100 components may be located remotely from other carrier computing entity 100 components, such as in a distributed system. Furthermore, one or more of the components may be combined and additional components performing functions described herein may be included in the carrier computing entity 100. Thus, the carrier computing entity 100 can be adapted to accommodate a variety of needs and circumstances. As will be recognized, these architectures and descriptions are provided for exemplary purposes only and are not limiting to the various embodiments.

2. Exemplary User Computing Entities

Figure 3:
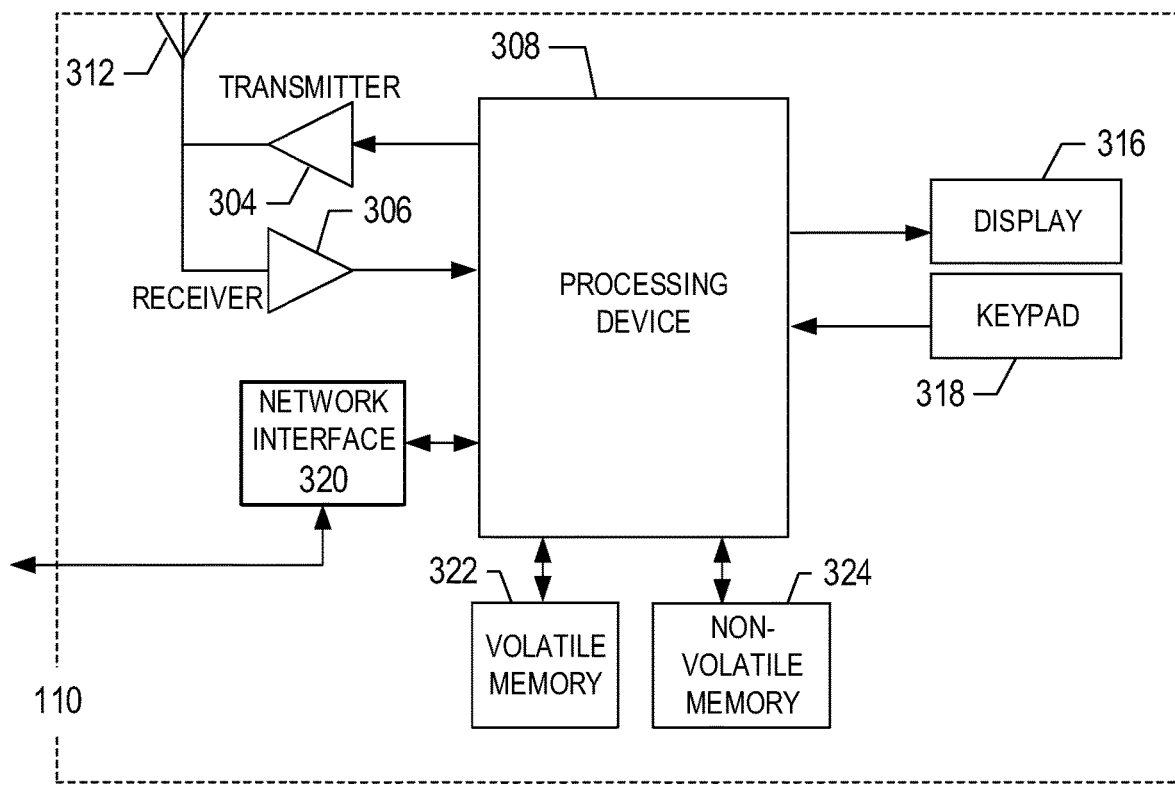
FIG. 3 is an exemplary schematic diagram of a user computing entity according to one embodiment of the present invention.

A user may be an individual, a family, a company, an organization, an entity, a department within an organization, a representative of an organization and/or person, and/or the like—whether or not associated with a carrier. To do so, a user may operate a user computing entity 110 that may include one or more components that are functionally similar to those of the carrier computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties, including carrier personnel (sorters, loaders, delivery drivers, network administrators, and/or the like). As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier computing entity 100 via a network interface 320.

Via these communication standards and protocols, the user computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the carrier computing entity 100, as described herein. The user input interface can comprise any of a number of devices or interfaces allowing the user computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier computing entity 100 and/or various other computing entities.

In another embodiment, the user computing entity 110 may include one or more components or functionality that are the same or similar to those of the carrier computing entity 100, as described in greater detail above. As will be recognized, these architectures and descriptions are provided for exemplary purposes only and are not limiting to the various embodiments.

3. Exemplary Detection Device

A detection device 400 according to various embodiments of the present invention may be configured to detect objects and/or surfaces within a Field of View (FOV) of the detection device 400. A detection device 400 may utilize one or more sensors to detect the presence and/or location of objects and/or surfaces (e.g., exterior and/or interior surfaces of objects) within the FOV. For example, the detection device 400 may utilize Light Detection and Ranging (LIDAR) sensors, Flash LIDAR sensors, Laser Detection and Ranging (LADAR) sensors, Airborne Laser Swath Mapping (ALSM) sensors, laser altimetry sensors, loop-sensors (e.g., inductive loops), structured light sensors, and/or the like. For example, a detection device 400 may comprise one or more laser generators operating in association with one or more laser detectors. As a non-limiting example, a detection device 400 may comprise a plurality of laser generator-laser detector pairs. As a non-limiting example, the detection device 400 may comprise 8 laser generator-laser detector pairs. In various embodiments, the laser generator may generate and transmit pulsed laser light into the FOV of the device. The FOV of the device may comprise an area around the detection device 400 into which the device may transmit laser light and from which the device may detect laser light. As a non-limiting example, a detection device 400 may have a FOV of 360 degrees in a first plane and 40 degrees in a second plane, although detection devices 400 having a more limited FOV in the first plane and/or a more expansive or more limited FOV in the second plane are contemplated. In various embodiments, the second plane is perpendicular to the first plane.

Various embodiments of the present invention may comprise a detection device 400 to determine the location of objects and surfaces within the FOV by measuring the time between generating a laser pulse and the time it is detected. Various embodiments of the present invention may alternatively utilize a plurality of laser generators to incorporate triangulation techniques to locate various objects and surfaces within the FOV of the detection device 400.

In various embodiments, the detection device 400 may additionally include an antenna, a transmitter (e.g., radio), a receiver (e.g., radio), and a processing element (e.g., CPLDs, microprocessors, multi-core processors, coprocessing entities, ASIPs, microcontrollers, and/or controllers) that provides signals to and receives signals from the transmitter and receiver, respectively.

The signals provided to and received from the transmitter and the receiver, respectively, may include signaling information in accordance with air interface standards of applicable wireless systems. In this regard, the detection device 400 may be capable of operating with one or more air interface standards, communication protocols, modulation types, and access types. More particularly, the detection device 400 may operate in accordance with any of a number of wireless communication standards and protocols, such as those described above with regard to the carrier computing entity 100 and the user computing entity 110. In a particular embodiment, the detection device 400 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the detection device 400 may operate in accordance with multiple wired communication standards and protocols, such as those described above with regard to the carrier computing entity 100 via a network interface.

Via these communication standards and protocols, the detection device 400 can communicate with various other entities. The detection device 400 can also download changes, add-ons, and updates, for instance, to its firmware, software (e.g., including executable instructions, applications, program modules), and operating system.

In various embodiments, the detection device 400 may include one or more components or functionality that are the same or similar to those of the carrier computing entity 100 and/or the user computing entity 110, as described in greater detail above. As will be recognized, these architectures and descriptions are provided for exemplary purposes only and are not limiting to the various embodiments.

Exemplary System Operation

Referring now to FIGS. 4-8, exemplary operations will now be described. Such operation may be utilized to detect voids (e.g., empty volumes) in a receptacle 50 not occupied by an asset 10, and consequently determine the amount of volume utilized in a receptacle 50 by assets 10. Moreover, such operations may be utilized to detect possible sort locations within a receptacle 50 for placement of an identified asset 10 and to highlight a sort location for the identified asset 10. Operations may also be utilized to detect the location of a previously loaded asset 10 and to highlight the location of the previously loaded asset 10 to facilitate asset selection. According to various embodiments, a receptacle 50 may be a storage container, a tractor-trailer, a panel van, a passenger vehicle, an airplane, a helicopter, a trans-oceanic ocean liner, a barge, a delivery vehicle, a hovercraft, a bicycle, a storage area, a sort facility, an area within a soft facility, a building, a parking lot, a hospital, an area of a hospital, a nursery, a school, and/or the like. Moreover, in various embodiments, an asset 10 may comprise any tangible item (e.g., a package, bundle, bag, storage container, vehicle, a collection of items banded together, a person, and/or the like) or a person (e.g., an employee). As noted, individual assets 10 may be loaded into a receptacle 50 (e.g., a storage container), and also a plurality of receptacles 50 may be loaded into a larger receptacle 50 (e.g., a cargo plane or a trans-oceanic ocean liner). Described concepts for placement and scanning of assets 10 may therefore be applied to the placement and scanning of receptacles 50 as well. However, for the sake of brevity, such concepts will only be described with reference to assets 10.

1. Void Detection

Figure 4:
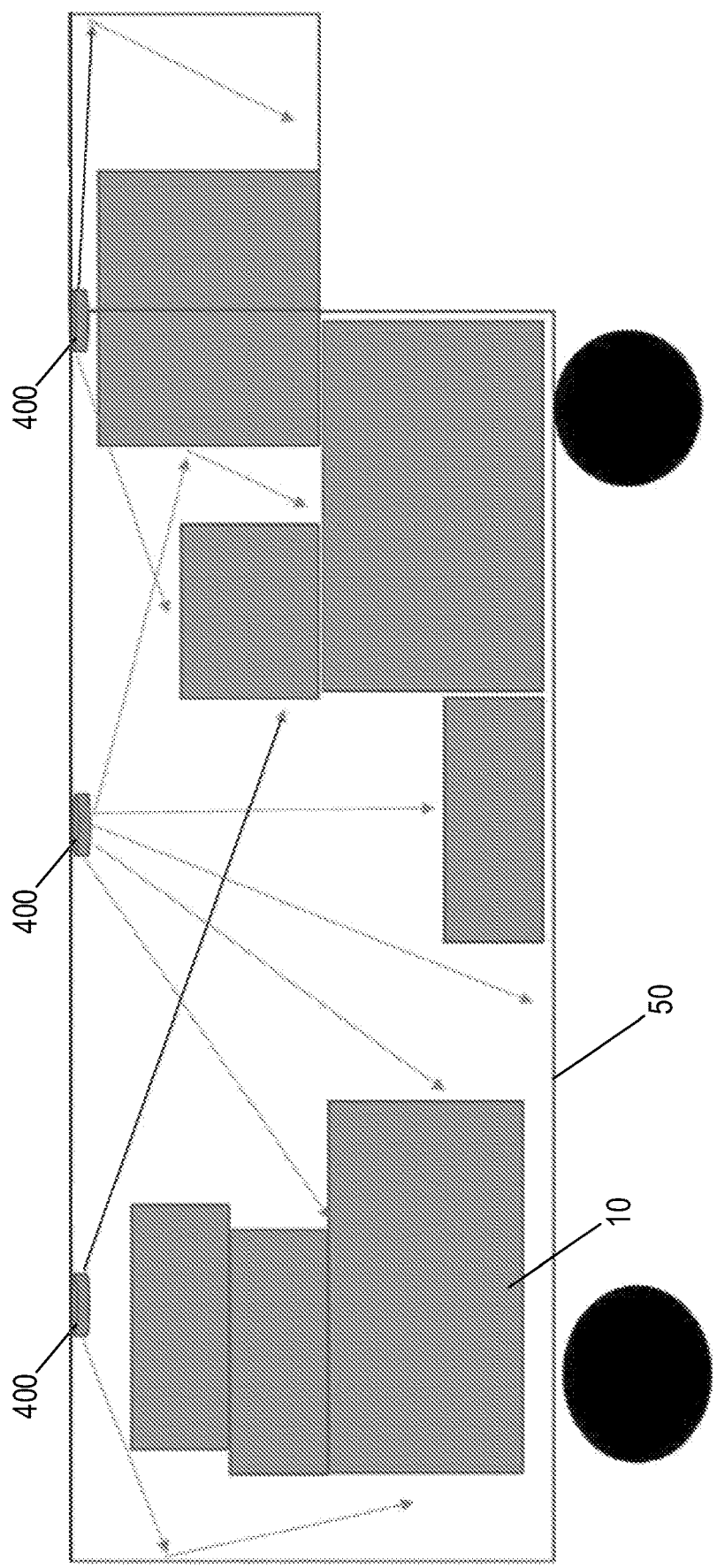
FIG. 4 is an exemplary schematic diagram of a detection system scanning a receptacle according to various embodiments of the present invention.
Figure 5:
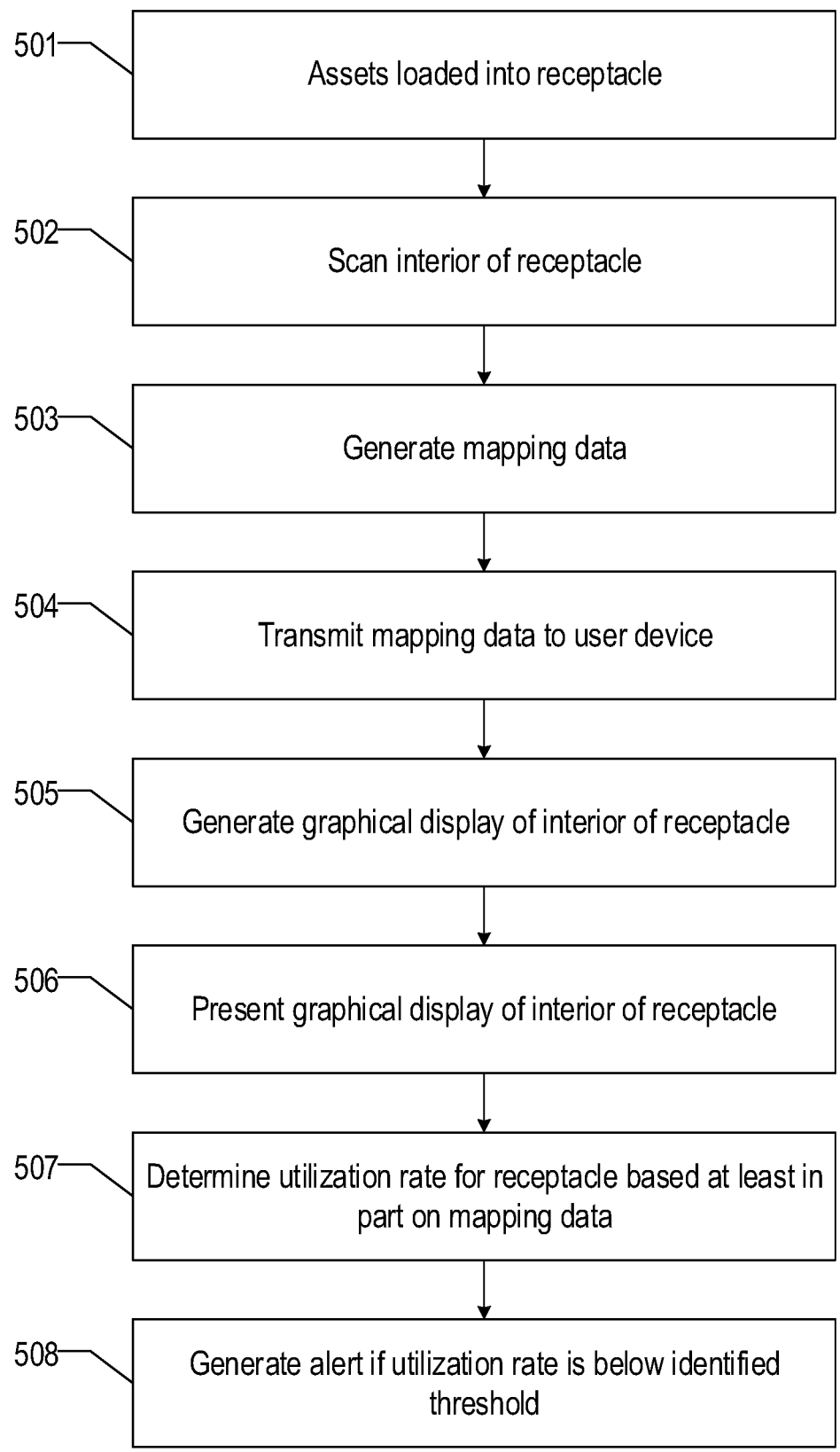
FIG. 5 is a flow chart illustrating steps for locating voids within a receptacle according to various embodiments of the present invention.

FIG. 4 illustrates a plurality of detection devices 400 scanning the interior of a receptacle 50. Various embodiments of the present invention may be utilized to detect voids in a receptacle 50. FIG. 5 illustrates an exemplary method for determining a utilization rate for a receptacle 50. As a receptacle 50 is loaded with one or more assets 10 as indicated at Block 501 of FIG. 5, various embodiments of the present invention may utilize a detection system comprising one or more detection devices 400 to scan the interior of the receptacle 50 at Block 502. Such scans may be performed after loading has been completed for a particular receptacle 50, or it may be performed periodically (e.g., every 1 minute), continuously, or in response to certain triggers. For example, such scans may be performed in response to receipt of user input requesting that one or more scans be performed.

Based on the signals received by the one or more detection devices 400, the detection system may generate mapping information/data indicative of the location of surfaces and assets 10 in the interior of the receptacle 50 at Block 503 of FIG. 5. In various embodiments, the mapping information/data may comprise location data indicative of the location of a plurality of surfaces present within the FOV of the one or more detection devices 400. The mapping information/data may indicate the size of each of these two dimensional surfaces (e.g., the length and width of the surfaces), the orientation of each of these surfaces relative to one or more other surfaces, the distance between surfaces, and/or the like. In various embodiments, the mapping information/data may comprise sufficient detail to distinguish between adjacent surfaces and parallel surfaces of various objects. In such embodiments, the one or more detection devices 400 may provide data indicative of the location of various surfaces with sufficient granularity to permit detection of small gaps between surfaces of adjacent objects. For example, the one or more detection devices 400 are configured to detect gaps between identically sized objects (e.g., identically sized packages) within a vertical stack of objects. As a specific and non-limiting example, a detection device 400 may have a resolution of 1 centimeter when measuring surfaces located 12 meters away from the sensor, such that the sensors may identify corresponding gaps between stacked or otherwise adjacent objects located less than 12 meters away. In various embodiments, each receptacle 50 may be associated with a sufficient number of detection devices 400 such that, collectively, the detection devices 400 provide sufficient resolution to identify gaps existing between stacked or otherwise adjacent objects positioned anywhere within the receptacle 50.

Moreover, in various embodiments, at least one of the detection devices 400, the carrier computing entity 100, and/or the user computing entities 110 may be configured to identify individual objects based on the data received from the detection devices 400. For example, at least one of the detection devices 400, the carrier computing entity 100, and/or the user computing entities 110 may be configured to apply one or more algorithms to associate various adjacent surfaces corresponding to a single object and/or to provide an estimated total volume of an individually detected object based on the data received from the detection devices 400. For example, upon a detection of a length, a width, and a height of a particular object (e.g., based on data received from the one or more detection devices 400 indicative of the size of at least two sides of an object), at least one of the detection devices 400, the carrier computing entity 100, and/or the user computing entities 110 may be configured to provide an estimated overall volume of the object based on an assumption that the non-visible sides of the object conform to the detected length, width, and height of the object.

In various embodiments, the mapping information/data may comprise data indicative of the volume of unused space (e.g., the voids, or volume of unused space existing between multiple assets 10 and/or between assets 10 and the walls of the receptacle 50). Moreover, the mapping information/data may be indicative of the size and shape of various assets 10. For example, the mapping information/data may indicate that a particular asset 10 existing between two other assets 10 has a length of 10 inches, a height of 14 inches, and a depth of 25 inches. The detection system may then transmit the mapping information/data to other computing entities at Block 504, such as the carrier computing entity 100 or user computing entity 110 for additional processing. In various embodiments, the mapping information/data may comprise information/data generated by multiple detection devices 400, and thus a computing entity (e.g., the carrier computing entity 100 or user computing entity 110) may be configured to analyze the received mapping information/data and combine the information/data from the multiple detection devices 400 to create a comprehensive map of the interior of the receptacle 50.

As previously indicated, at least one of the detection devices 400, the carrier computing entity 100, and/or the user computing entity 110 may be configured to provide an estimated overall shape of an object based at least in part on data identifying the overall length, width, and height of the object. In various embodiments, this data may be utilized to estimate the amount of volume occupied by each of a plurality of objects. However, various detection devices 400 may require an unobstructed line of sight with surfaces in order to provide a measurement of each of these surfaces. Accordingly, the existence of an object with the FOV of a detection device 400 may prevent the detection device 400 from detecting surfaces behind the object. This shadowing effect, in which an object within the FOV of a detection device 400 casts a "shadow" beyond the object (i.e., on the side of the object opposite the detection device 400) to create a blind spot in which the detection device 400 is incapable of detecting various surfaces, may prevent the detection device 400 from providing a complete view of the total volume of objects present within the receptacle 50. Accordingly, various embodiments may comprise a plurality of detection devices 400 corresponding to a particular receptacle 50. For example, the receptacle 50 may comprise a plurality of detection devices 400 disposed on one or more interior surfaces of the receptacle 50 which collectively provide a complete view of the interior of the receptacle 50.

In embodiments comprising a plurality of detection devices 400, at least one of the detection devices 400, the carrier computing entity 100, and/or the user computing entity 110 may be configured to logically overlay data generated by each of the plurality of detection devices 400 to provide a complete view of various objects. In various embodiments, the detection devices 400 may be calibrated such that common surfaces detected by each of a plurality of detection devices 400 are aligned in the logically overlaid data. For example, if the top surface of an object is within the FOV of two detection devices 400, the data generated by each of the detection devices 400 indicative of commonly viewed surface is logically overlaid. In various embodiments, each of the plurality of detection devices 400 may be calibrated such that surfaces viewed by a plurality of detection devices 400 may be identified based on the data generated by the detection devices 400 alone. However, in various embodiments, the receptacles 50 may comprise one or more reference surfaces positioned to be visible by a plurality of detection devices 400. The position and/or dimensions of the reference surface relative to each of the detection devices 400 may be known, such that the position and/or dimensions of the reference surface as indicated in the data generated by each of the plurality of detection devices 400 may be logically overlaid to facilitate matching commonly viewed surfaces provided in the data generated by each of the plurality of detection devices 400. For example, the receptacles 50 may comprise one or more protrusions having a known height, width, depth, and location on one or more interior surfaces that are visible by each of the plurality of detection devices 400. To logically overlay the data received from each of the detection devices 400, the location of the reference protrusions in the data received from each detection device 400 may be identified and overlaid, such that the location of other detected surfaces may be identified in relation to the reference protrusion.

Moreover, various embodiments may be configured to generate mapping information/data at various times while the receptacle 50 is being loaded in order to store data regarding possible empty space (i.e., voids) that may be present between and/or under assets 10 and therefore out of sight and/or undetectable by the one or more detection devices 400. For example, the one or more detection devices 400 may be configured to constantly record updated data regarding the location of detectable surfaces within the receptacle 50, to periodically (e.g., after predetermined periods of time have elapsed) update the recorded mapping information/data based on updated scans of the interior of the receptacle 50, or to record updated mapping information/data upon the occurrence of a triggering event. For example, the detection devices 400 may be configured to constantly monitor the level of assets 10 within the receptacle 50, however the detection devices 400 may be configured to discard updated mapping information/data unless the updated mapping information/data is indicative of the occurrence of a predetermined trigger event. For example, the predetermined trigger events may be one or more assets 10 protruding above one or more heights within the receptacle 50. Accordingly, each updated mapping information/data that indicates that a previously undetected asset 10 protrudes above a predetermined threshold height within the receptacle (e.g., a distance above a floor of the receptacle 50), the updated mapping information/data may be stored and/or transmitted to a carrier computing entity 100 and/or user computing entity 110 for additional storage and/or analysis. In various embodiments, one or more threshold heights may be provided to establish a plurality of triggering events. Moreover, in various embodiments, once a particular threshold height has been satisfied by a first asset, the satisfied threshold height may become inactive, such that a determination that a new, previously undetected asset 10 that separately satisfies the previously satisfied threshold height does not operate as a triggering event. However, in various embodiments, each instance in which updated mapping information/data indicates a threshold height is satisfied by new, previously undetected assets 10 may be considered a trigger event, even if a particular threshold height had been satisfied previously.

In various embodiments, at least one of the one or more detection devices 400, the carrier computing entity 100 and/or the user computing entity 110 may be configured to logically overlay the various iterations of mapping information/data recorded during the loading process of the receptacle 50 such that the overlaid mapping information/data may be indicative of voids existing between and/or under assets 10 positioned within the receptacle 50. As a specific example, a first iteration of mapping information/data may indicate that a void exists between a plurality of assets 10 in a lower layer of assets 10 positioned within the receptacle, and a second iteration of mapping information/data may indicate that one or more new assets 10 were placed on top of the lower layer of assets 10, thereby covering the void located within the lower level without placing a package therein. Accordingly, after overlaying a plurality of iterations of mapping information/data during the loading process, the mapping information/data may be indicative of the location and/or size of voids within the receptacle 50, even if such voids are undetectable by the detection devices 400 after the receptacle 50 has been completely loaded.

Based at least in part on the mapping information/data, the carrier computing entity 100 and/or user computing entity 110 may be configured to determine a utilization rate for the receptacle 50 at Block 507. As a non-limiting example, the volume of empty space (i.e., voids) between assets 10 may be determined, and the aggregate volume of empty space (i.e., voids) may be determined by summing the determined volume of each void located in the receptacle 50. The aggregate volume of empty space may then be compared against the total receptacle volume (which may be provided based on user input and/or based on data generated by the one or more detection devices 400 while the corresponding receptacle 50 is empty) to determine a utilization rate indicative of the percentage of the receptacle 50 filled by assets 10.

In various embodiments, the carrier computing entity 100 or user computing entity 110 may be configured to receive user input defining a utilization alert threshold. Upon a determination that the receptacle 50 contains assets 10 occupying a portion of the receptacle 50 less than the defined utilization alert threshold, an alert may be generated indicative of the presence of substantial voids within the receptacle 50 at Block 508. As a non-limiting example, the utilization alert threshold may be defined at 55% utilization, such that an alert will be generated in response to a determination that less than 55% of the receptacle 50 is filled with assets 10. Concepts for determining a utilization rate of a receptacle 50 are discussed in greater detail in commonly owned U.S. patent application Ser. No. 12/340,233, entitled "Trailer Utilization Systems, Methods, Computer Programs Embodied on Computer-Readable Media, and Apparatuses," which was filed on Dec. 19, 2008 and published as U.S. Patent Publication Number 2010/0161170, which is incorporated herein in its entirety by reference, and commonly owned U.S. patent application Ser. No. 11/457,015, entitled "Systems and Methods for Forecasting Container Density," which was filed on Jul. 12, 2006 and published as U.S. Patent Publication Number 2007/0016538, which is incorporated herein in its entirety by reference.

Moreover, in various embodiments, the carrier computing entity 100 and/or user computing entity 110 may be configured to generate a graphical display of the interior of the receptacle 50 based at least in part on the mapping information/data at Block 505. The generated graphical display may then be presented to a user via a display device at Block 506.

These and other embodiments may facilitate the identification of improper loading of receptacles 50. Based at least in part on the graphical display of the interior of a receptacle 50, users (e.g., carrier personnel) may identify locations with the receptacle 50 that may be filled with additional assets 10, without unloading every asset 10 from the receptacle 50. In various embodiments, the identification of voids may facilitate a determination that additional assets 10 may be loaded into a particular receptacle 50 in order to minimize the total number of receptacles 50 needed to contain each and every asset 10.

Moreover, various embodiments of the present invention may receive input indicative of the total cost to operate a receptacle 50. The carrier computing entity 100 and/or user computing entity 110 may compare the total cost to operate the receptacle 50 against the utilization rate to determine possible cost savings associated with more efficient loading of receptacles 50. Additionally, the detection system may additionally be configured to determine the dimensions of each asset 10 loaded into the receptacle 50. Based at least in part on the determined dimensions of each asset 10, the total cost to operate the receptacle 50 attributable to each asset 10 may be determined.

2. Sort Location Selection

Various embodiments of the present invention may be utilized to determine a sort location for placement of an identified asset 10 within a receptacle 50. In various embodiments, such determination may be based at least in part on the determined dimensions of the identified asset 10, the determined weight of the asset 10, and the current layout of the interior of the receptacle 50. In considering the current layout of the interior of the receptacle 50, the interior dimensions of the receptacle 50 may be considered, as well as the location of previously loaded assets 10.

Figure 6:
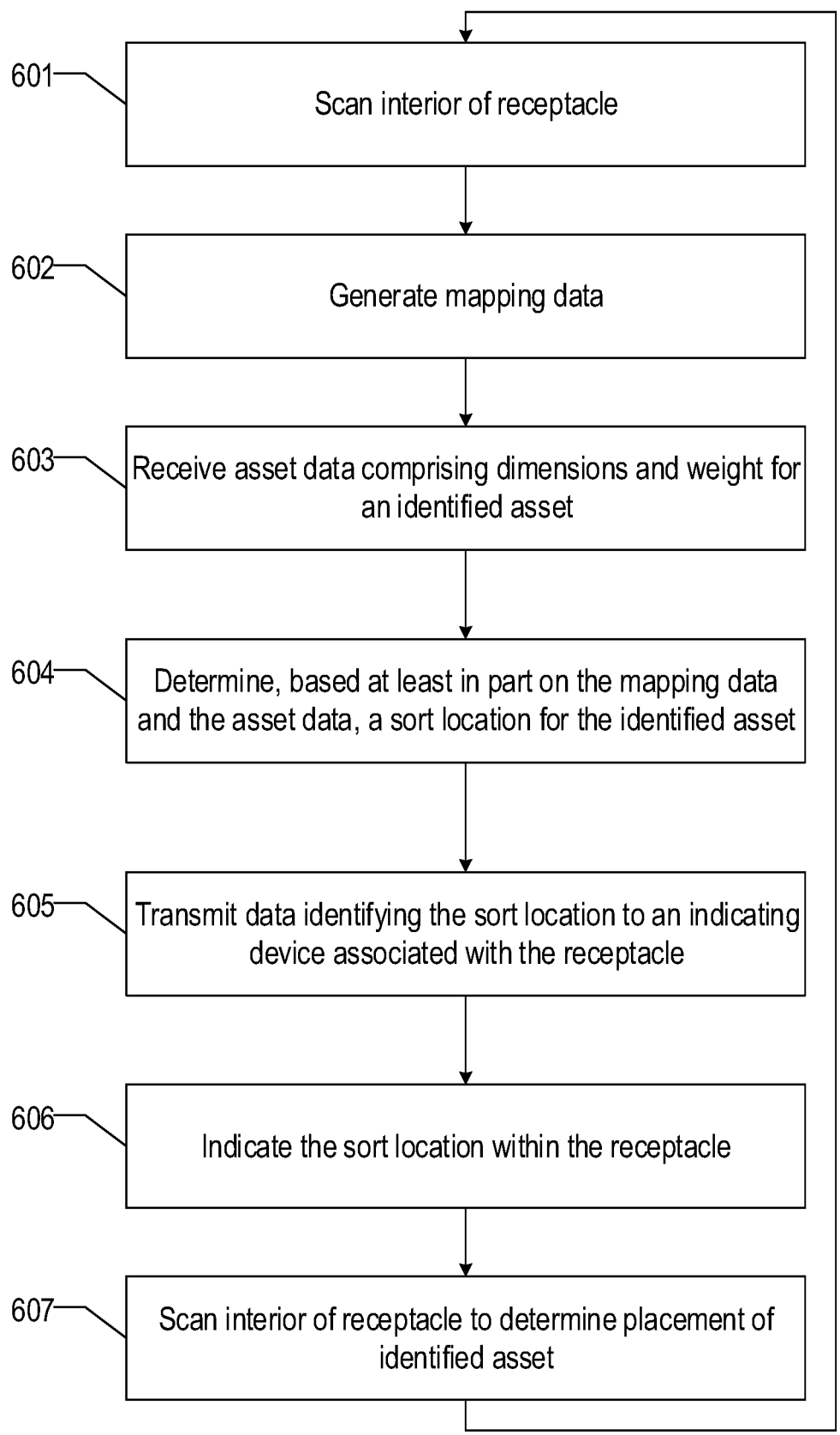
FIG. 6 is a flow chart illustrating steps for determining a sort location for an asset according to various embodiments of the present invention.

Referring now to FIG. 6, which illustrates exemplary steps in indicating a sort location within a receptacle 50, the detection system may scan the interior of a receptacle 50 to determine the current layout of the interior of the receptacle 50 at Block 601. As described herein, the detection system may comprise one or more detection devices 400 that may receive signals indicative of the location of various objects and surfaces (e.g., assets 10). In embodiments utilizing a plurality of detection devices 400, an appropriate computing entity (e.g., the carrier computing entity 100 and/or user computing entity 110) may generate a substantially complete view of the interior of the receptacle 50 based at least in part on the signals received by each of the plurality of detection devices 400. At least one of the detection system, the carrier computing entity 100, and the user computing entity 110 may then generate mapping data indicative of the location of the various assets 10 in the receptacle 50 at Block 602.

The detection system may also determine the dimensions of an asset 10 to be loaded into the receptacle 50, and may generate asset data comprising information/data indicative of the determined asset dimensions at Block 603. Such determination may be based on scans of the asset 10 from one or more detection devices 400. Alternatively, such information may be provided via user input or may be provided by a dimensioning system that previously determined the dimensions of the asset 10, and may be associated with the generated asset data for the asset 10 to be loaded. Moreover, the asset data may also be associated with additional shipping data corresponding to the asset 10 (e.g., a unique tracking identifier, information/data regarding the origin and destination of the asset 10, tracking information, and/or the like). Exemplary shipping data are described in detail in U.S. patent application Ser. No. 13/746,862, entitled "Customer Controlled Management of Shipments," filed Jan. 22, 2013 and published as U.S. Patent Publication Number 2013/0138573, which is incorporated herein in its entirety by reference. In various embodiments, asset data may be provided by user input when the asset 10 is first introduced to the carrier transportation network, and any included dimensions may be verified based on scans of the asset 10 from one or more detection devices 400.

Based at least in part on the asset data and the mapping information/data, one of the detection system, the carrier computing entity 100, and/or the user computing entity 110 may determine a sort location for the asset 10 to be loaded and may generate sort data indicative of the determined sort location at Block 604. In various embodiments, a sort location for the asset 10 may be selected from one of a plurality of previously identified sort locations. For example, the previously identified sort locations may comprise a sort location for incompatible assets, a sort location for small assets, a sort location for all other assets, and/or the like. Thus, as a non-limiting example, a sort location may be determined for an asset 10 based at least in part on the size of the asset 10. For example, an asset 10 having a length plus a girth (twice the sum of the width plus the height) in excess of a predefined limit may be considered an "incompatible" asset and thus may be sorted to a first sort location. An asset 10 having a weight below a predefined threshold may be considered a "small" and may be sorted to a second sort location designated as a "smalls" sort location (e.g., a "smalls bag"). All other assets may be sorted to a third sort location. As another non-limiting example, a 20"×20"×36" package (e.g., asset) is to be loaded into tractor-trailer containing several previously loaded packages. The detection system may locate an empty space between several previously loaded packages being approximately 22" in width, 21" in depth, and 72" in height. Based at least in part on the size of the package to be loaded and the size of the available space, at least one of the detection system, the carrier computing entity 100, and the user computing entity 110 may determine that the located empty space is a potential location for placing the package. In various embodiments, at least one of the detection system, the carrier computing entity 100, and the user computing entity 110 may determine an optimal sort location from a plurality of possible sort locations for an asset 10 based at least in part on additional information/data regarding additional assets 10 to be loaded.

In various embodiments, once a sort location has been determined, the sort data may be transmitted to an indicating device associated with the receptacle 50 configured to highlight the sort location at Block 605. In various embodiments, the indicating device may be coupled to the receptacle 50, or it may be located outside of the receptacle 50. In various embodiments, multiple indicating devices may be associated with a single receptacle 50. Alternatively, a single indicating device may be associated with 2 or more receptacles 50. In various embodiments, the indicating device may be calibrated by determining its position relative to the receptacle 50. As a non-limiting example, the indicating device may be located a given distance from a ceiling, a first side wall, and a loading door of the receptacle 50. Calibration data comprising the determined location of the indicating device may be transmitted to the carrier computing entity 100 and/or the user computing entity 110.

At Block 606, the indicating device indicates the sort location within the receptacle 50. The indicating device may comprise a light generator configured to generate a light in order to highlight the optimal sort location for the asset 10. In various embodiments, the light generator may be a laser light generator configured to generate a concentrated point of light on or near the optimal sort location. However, other light generators, such as spot lights, halogen lights, Light Emitting Diodes (LEDs), incandescent lights, candescent lights, and/or the like may also be utilized. In yet other embodiments, the indicating device may comprise Virtual Reality (VR) glasses configured to overlay a graphical indication of one or more sort locations over the field of view of the user.

Moreover, in various embodiments, the indicating device may comprise a plurality of indicators (e.g., lights) corresponding to particular portions of the receptacle 50. For example, each of the plurality of indicators may be aligned with a "lane" (e.g., a portion of the receptacle 50 extending along the length of the receptacle 50). In such embodiments, upon the determination that the optimal sort location is aligned with a particular lane, the indicating device may be configured to illuminate the light corresponding to the particular lane. In various embodiments, the indicators may be placed within the floor of the receptacle 50, the ceiling of the receptacle 50, the walls of the receptacle 50, and/or the like.

Upon receipt of the sort data, the indicating device may be configured to direct the light generator to direct light onto the determined sort location. By directing light onto the determined sort location, the indicating device highlights the sort location for loading personnel placing assets 10 into the receptacle 50.

In various embodiments, at least one of the carrier computing entity 100, the user computing entity 110, and/or the detection system may receive asset data indicative of the weight of the asset 10 to be loaded. In determining a sort location, at least one of the carrier computing entity 100, the user computing entity 110, and/or the detection system may utilize the asset data comprising asset weight information to determine whether the asset 10 should be placed on top of other assets 10. For example, at least one of the carrier computing entity 100, the user computing entity 110, and/or the detection system may determine that an asset 10 having a weight above a predetermined threshold weight should not be placed on top of other assets 10 within the receptacle 50.

Alternatively, the sort data may be transmitted to an automated loading mechanism (e.g., a robot) configured to place assets 10 into the receptacle 50 based on the determined sort location. For example, the automated loading mechanism may be configured in accordance with the described systems of U.S. Pat. No. 5,908,283, which is incorporated herein by reference in its entirety.

In various embodiments, the detection system may be configured to scan the interior of the receptacle 50 at Block 607 after placement of the asset 10 in order to determine the location at which the asset 10 was placed.

3. Locating Previously Loaded Assets

Figure 7B:
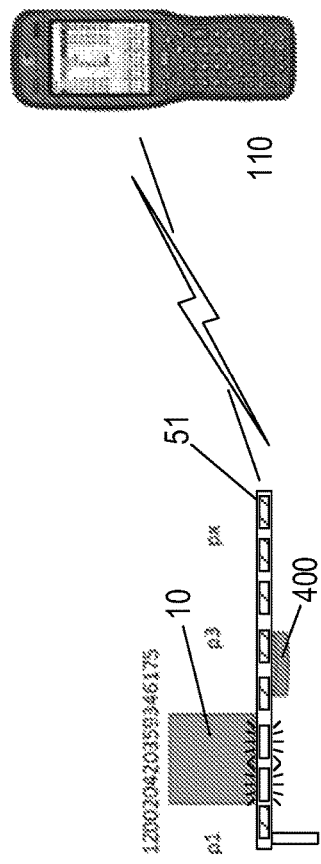
FIG. 7B is a close-up view of a portion of the schematic diagram shown in FIG. 7A according to various embodiments of the present invention.
Figure 7A:
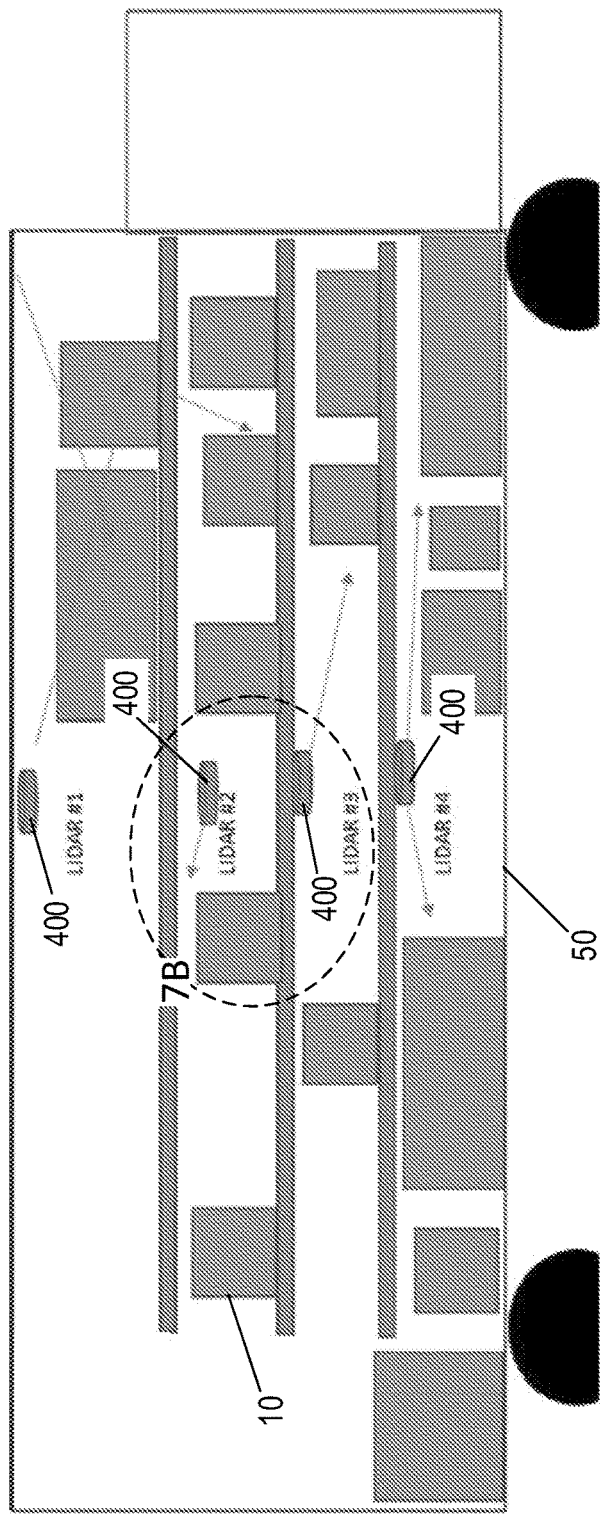
FIG. 7A is an exemplary schematic diagram of a detection system scanning a receptacle according to various embodiments of the present invention.
Figure 8:
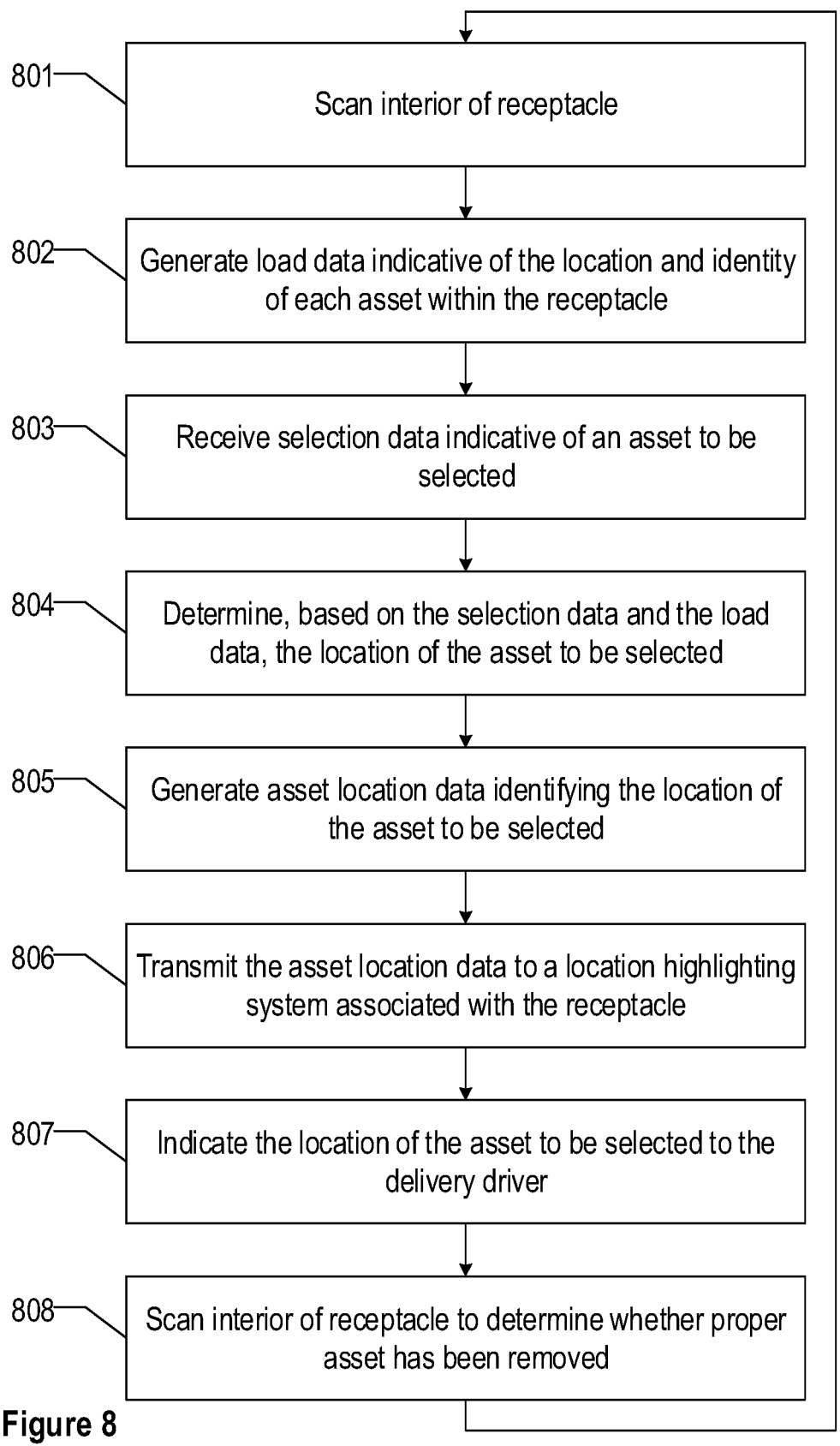
FIG. 8 is a flow chart illustrating steps for determining the location of a previously loaded asset in a receptacle according to various embodiments of the present invention.

Referring now to FIGS. 7A-8, various embodiments of the present invention may be utilized to determine the current location of a previously loaded asset 10 to facilitate asset selection. As a non-limiting example, such embodiments may facilitate selection of an appropriate asset 10 to be delivered at a particular delivery location by a delivery driver.

As illustrated in FIG. 7A, one or more detection devices 400 may be coupled to a receptacle 50 (e.g., a delivery vehicle) to facilitate the process of locating assets 10 previously loaded therein. The receptacle 50 may comprise a plurality of detection devices 400, each associated with a particular scan volume (e.g., one or more shelves 51 located within the receptacle 50). In various embodiments, such detection devices 400 may be configured to identify each asset 10 loaded in the receptacle 50 utilizing an asset identifier reader (e.g., a barcode scanner, an RFID reader, a camera, a stereo camera, and/or the like) that may be configured to obtain information from asset identifiers associated with each asset. In various embodiments, the asset identifier reader may be incorporated into the detection device 400, such that a single device may be utilized to locate an asset 10 within the receptacle 50, or the detection device 400 may be utilized with a separate asset identifier reader used to identify each asset 10 loaded in the receptacle 50. For example, a separate asset identifier reader may be similar to that described in commonly owned U.S. Pat. No. 8,068,930 entitled "Method and System for Performing a Package Pre-load Operation in Accordance with a Dispatch Plan," which is incorporated herein in its entirety by reference. As yet another embodiment, a stereo camera configured to determine relative sizes and/or locations of objects, images, and/or the like may be provided to detect one or more asset identifiers disposed on one or more surfaces visible to the stereo camera. In various embodiments, the stereo camera may have sufficient resolution to enable the stereo camera (and/or another computing entity) to decode or otherwise identify an asset identifier visible within a FOV of the stereo camera. Upon determining the relative location of the asset identifier, one or more of the computing devices (e.g., the carrier computing entity 100 and/or the user computing entity 110) may be configured to logically overlay the detected surfaces and asset identifiers to associate the asset identifiers with corresponding detected surfaces of items.

In various embodiments, the detection device 400 may determine the location of each asset 10 located in the receptacle 50 while the assets 10 are being loaded into the receptacle 50. For example, at least one of the detection system, the one or more carrier computing entities 100, and the one or more user computer entities 110 may receive an identity of an asset 10 currently being loaded into the receptacle 50. Upon the asset 10 being loaded into the receptacle 50 at a particular location, the detection device 400 may determine the location of the asset 10 by detecting the location of the one or more surfaces of the asset 10. As a non-limiting example, the detection device 400 may be configured to identify previously unidentified surfaces (e.g., by comparing the surfaces identified during a current scan against the surfaces identified during a previous scan) and to associate these surfaces with the identity of the asset 10 currently being loaded. The identified location of the asset 10 may be associated with the identity of the asset 10, and may be later utilized to highlight the location of the asset 10.

FIG. 8 illustrates an exemplary method of identifying the location of an identified asset 10 previously loaded within a receptacle 50. As shown in FIG. 8, after the receptacle 50 is loaded with one or more assets 10, a detection system comprising one or more detection devices 400 and one or more asset identifier readers scans the interior of the receptacle 50 at Block 801 and generates load data indicative of the location and identity of each asset 10 within the receptacle 50 at Block 802. In various embodiments, the load data may be transmitted to the one or more carrier computing entities 100 and/or the one or more user computing entities 110. In various embodiments, the load data may comprise an asset position map indicative of the locations of each asset 10 loaded in the receptacle 50.

At least one of the detection system, the one or more carrier computing entities 100, and the one or more user computing entities 110 may receive selection information/data indicative of an asset 10 to be selected at Block 803. In various embodiments, the selection information/data may be received immediately before an asset 10 is to be selected (e.g., immediately before a delivery vehicle arrives at a delivery location for an asset 10). Upon receipt of such selection information/data, at least one of the detection system, the one or more carrier computing entities 100, and the one or more user computing entities 110 may determine, based at least in part on the selection information/data and the load data, the location of the asset 10 to be selected at Block 804 and may generate asset location information/data indicative of the determined location at Block 805.

In various embodiments, the generated asset location data may be transmitted to a location highlighting system configured to indicate the location of the asset 10 to be selected at Block 806. Such location highlighting system may comprise one or more mechanical or electronic devices configured to convey the current location of the asset 10 to be selected to one or more personnel at Block 807. For example, as illustrated in FIG. 7B, which provides a close-up view of a portion of the illustration shown in FIG. 7A, each of a plurality of shelves 51 configured to support one or more assets 10 may comprise a plurality of light sources (e.g., LEDs) configured to be selectively illuminated to indicate the location of an asset 10. Such plurality of light sources may include multiple colors, so as to further highlight the location of the asset 10. In various embodiments, the plurality of light sources may be utilized to highlight a zone in which the asset 10 is located. A zone may comprise a shelf, a portion of a shelf, or another portion of the receptacle. Alternatively, the location highlighting system may comprise a light generator such as that described above configured to direct a concentrated point of light to the asset 10 to be selected.

Such systems and methods may improve personnel productivity by decreasing the amount of time needed to load an asset 10 in an assigned location within a receptacle 50 and the time needed to locate a previously loaded asset 10. Instead of placing each asset 10 at an assigned location, loading personnel may place assets 10 in any location within a receptacle 50, and delivery personnel (e.g., a delivery driver) may later rely on the systems and methods to quickly locate a previously loaded asset 10 to be selected. Moreover, such systems and methods may decrease the number of human errors in placing an asset 10 at an incorrect location within a receptacle 50 during loading because assigned sort locations for each asset 10 may be unnecessary in order to reduce the amount of time necessary to locate an asset 10.

Referring again to FIG. 8, in various embodiments the detection system may be configured to scan the interior of the receptacle 50 in order to determine whether the proper asset 10 has been removed at Block 808. The detection system may determine the identity of assets 10 remaining in the receptacle 50 after an asset 10 has been removed, and based at least in part on the previously generated sort data, may determine which asset 10 has been removed. Based at least on the determined identity of the asset 10 that has been removed and the selection information/data, the detection system may determine whether the proper asset 10 has been removed. Alternatively, the detection system may transmit the information/data identifying the assets 10 remaining in the receptacle 50 to at least one of the one or more carrier computing entities 100 and/or the one or more user computing entities 110, which may be configured to determine whether the appropriate asset 10 has been removed.

Upon a determination that an inappropriate asset 10 has been removed from the receptacle 50, at least one of the detection system, the one or more carrier computing systems 100, and the one or more user computing system 110 may be configured to generate an alert to inform the personnel (e.g., the delivery driver) that an inappropriate asset 10 has been removed. In various embodiments, such alert may be transmitted to a user computing device 110 carried by the personnel (e.g., the delivery driver), or it may be conveyed to the personnel utilizing the location highlighting system.

The steps described in reference to FIGS. 7A-7B and 8 may be performed one or more times after a receptacle 50 has been loaded. As a non-limiting example, the steps of scanning the interior of the receptacle 50 to determine the current location of each of the loaded assets 10 may be performed immediately after the receptacle 50 has been loaded in order to determine an initial location of each of the one or more assets 10. Moreover, in various embodiments, the steps of scanning the interior of the receptacle 50 to determine the current location of each of the loaded assets 10 may be performed prior to selecting an asset 10 to be removed, such that a current location of each of the plurality of assets 10 may be determined after the assets 10 may have shifted during transportation.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. One or more non-transitory computer-readable storage media storing computer-readable instructions thereon that, when executed by a processor, perform a method comprising:
receiving location data indicative of a location of tangible surfaces within a receptacle, wherein the location of the tangible surfaces is detected using a plurality of sensors, wherein two or more of the plurality of sensors are calibrated to detect at least one commonly-viewed tangible surface of the tangible surfaces in each of their respective fields of view; and
generating mapping data indicative of the location of the tangible surfaces within the receptacle based on the location data, wherein the mapping data is generated by a processor logically overlaying at least a portion of the location data received from the plurality of sensors, and wherein the location data received from the two or more of the plurality of sensors that corresponds to the at least one commonly-viewed tangible surface in each of their respective fields of view is aligned when logically overlaid.

2. The media of claim 1, wherein the method performed by executing the computer-readable instructions stored thereon further comprises:
determining an amount of occupied volume within the receptacle based on the mapping data;
determining the amount of occupied volume relative to data indicative of the total volume of the receptacle; and
determining a utilization rate of the receptacle based on the amount of occupied volume and the total volume of the receptacle.

3. The media of claim 1, wherein the method performed by executing the computer-readable instructions stored thereon further comprises:
determining a total amount of unoccupied volume within the receptacle based on the mapping data;
determining the total amount of unoccupied volume relative to data indicative of the total volume of the receptacle; and
determining a utilization rate of the receptacle based on the total amount of unoccupied volume and the total volume of the receptacle.

4. The media of claim 3, wherein the method performed by executing the computer-readable instructions stored thereon further comprises:
determining the total amount of unoccupied volume meets or exceeds a predetermined threshold; and
generating an alert when a determination that the total amount of unoccupied volume meets or exceeds the predetermined threshold.

5. The media of claim 3, wherein the total amount unoccupied volume exists between the tangible surfaces detected within the receptacle.

6. The media of claim 1, wherein the sensor is a Light Detection and Ranging sensor.

7. One or more non-transitory computer-readable storage media storing computer-readable instructions thereon that, when executed by a processor, perform a method comprising:
detecting a location of tangible surfaces within an interior of a receptacle, wherein the location is detected by a plurality of sensors that scan the interior of the receptacle, wherein two or more of the plurality of sensors are calibrated to detect at least one commonly-viewed tangible surface of the tangible surfaces in each of their respective fields of view;
generating location data indicative of the location of the tangible surfaces detected within the interior of the receptacle; and
generating mapping data indicative of the location of the tangible surfaces detected within the receptacle based on the location data generated by the sensor, wherein the mapping data is generated by a processor logically overlaying at least a portion of the location data received from the plurality of sensors, and wherein the location data received from the two or more of the plurality of sensors that corresponds to the at least one commonly-viewed tangible surface in each of their respective fields of view is aligned when logically overlaid.

8. The media of claim 7, wherein the method performed by executing the computer-readable instructions stored thereon further comprises:
receiving asset data comprising data indicative of physical dimensions of an asset; and
identifying a sort location within the receptacle for placing the asset based on the asset data relative to the mapping data.

9. The media of claim 8, wherein the method performed by executing the computer-readable instructions stored thereon further comprises:
activating an indicator to indicate the sort location by directing a light source onto an unoccupied volume within the receptacle corresponding to the sort location.

10. The media of claim 8, wherein the method performed by executing the computer-readable instructions stored thereon further comprises:
activating an indicator to indicate the sort location via virtual reality, wherein the indicator provides a graphical indication of one or more sort locations over a field of view of a user to indicate an unoccupied volume within the receptacle corresponding to the sort location.

11. The media of claim 8, wherein the method performed by executing the computer-readable instructions stored thereon further comprises:
receiving updated location data indicative of the location of the tangible surfaces within the receptacle from the sensor after the asset has been placed within the receptacle.

12. The media of claim 10, wherein the method performed by executing the computer-readable instructions stored thereon further comprises:
comparing the updated location data and the previously received location data to determine the location of the asset placed within the receptacle; and
storing data indicative of the location of the asset placed within the receptacle in association with the asset data.

13. The media of claim 7, wherein the method performed by executing the computer-readable instructions stored thereon further comprises:
receiving asset data from the plurality of sensors, wherein the plurality of sensors are collectively configured to measure physical dimensions of an asset.

14. The media of claim 7, wherein the method performed by executing the computer-readable instructions stored thereon further comprises:
measuring dimensions of open volumes within the receptacle; and identifying one or more available sort locations corresponding to the open volumes within the receptacle for placing an asset based on the mapping data.

15. One or more non-transitory computer-readable storage media storing computer-readable instructions thereon that, when executed by a processor, perform a method comprising:

detecting a location of tangible surfaces within a receptacle using a plurality of sensors, wherein two or more of the plurality of sensors are calibrated to detect at least one commonly-viewed tangible surface of the tangible surfaces in each of their respective fields of view;

detecting a location of an asset identifier disposed on the at least one commonly-viewed tangible surface in the respective fields of view of the two or more plurality of sensors within the receptacle;

generating mapping data indicative of the location of the tangible surfaces and indicative of the location of the asset identifier, wherein the mapping data is generated by a processor logically aligning and overlaying at least a portion of the location data received from the two or more of the plurality of sensors that corresponds to the at least one commonly-viewed tangible surface in each of their respective fields of view;

associating the asset identifier with one or more of the tangible surfaces based on the location of the tangible surfaces relative to the location of the asset identifier; and activating an indicator to indicate the location of an asset within the receptacle based on a request to locate the asset corresponding to the asset identifier.

16. The media of claim 15, wherein the asset identifier comprises a bar code printed on a surface of the asset.

17. The media of claim 15, wherein the request to locate the asset is received from a mobile device.

18. The media of claim 15, wherein activating the indicator further comprises illuminating one or more lights positioned proximate to the location of the asset corresponding to the asset identifier.

* * * * *